United States Patent
Miner et al.

(10) Patent No.: US 9,980,113 B2
(45) Date of Patent: May 22, 2018

(54) EMERGENCY COMMUNICATIONS FROM A LOCAL AREA NETWORK HOTSPOT

(71) Applicant: Iridium Satellite LLC, McLean, VA (US)

(72) Inventors: Joshua Miner, Potomac Falls, VA (US); Kristine Kaehler, Leesburg, VA (US)

(73) Assignee: Iridium Satellite LLC, McLean, VA (US)

( * ) Notice: Subject to any disclaimer, the term of this patent is extended or adjusted under 35 U.S.C. 154(b) by 0 days. days.

(21) Appl. No.: 15/401,465

(22) Filed: Jan. 9, 2017

(65) Prior Publication Data

US 2017/0127259 A1    May 4, 2017

Related U.S. Application Data

(63) Continuation of application No. 14/584,259, filed on Dec. 29, 2014, now Pat. No. 9,565,541.

(51) Int. Cl.
| | |
|---|---|
| H04W 4/22 | (2009.01) |
| H04W 4/14 | (2009.01) |
| H04W 64/00 | (2009.01) |
| H04L 29/12 | (2006.01) |
| G01S 19/17 | (2010.01) |
| H04W 84/12 | (2009.01) |

(52) U.S. Cl.
CPC ............... *H04W 4/22* (2013.01); *G01S 19/17* (2013.01); *H04L 61/106* (2013.01); *H04W 4/14* (2013.01); *H04W 64/003* (2013.01); *H04W 84/12* (2013.01)

(58) Field of Classification Search
CPC ......... H04W 4/22; H04W 4/14; H04W 84/12; G01S 19/17; G01S 19/24
USPC ......... 455/404.1, 404.2, 550.1, 412.2, 456.1, 455/456.5
See application file for complete search history.

(56) References Cited

U.S. PATENT DOCUMENTS

| | | | |
|---|---|---|---|
| 7,853,240 B2 * | 12/2010 | Abdel-Kader | H04M 1/72536 379/37 |
| 8,379,528 B1 * | 2/2013 | Xue | H04L 43/0817 370/241 |
| 8,830,971 B1 * | 9/2014 | Shipley | H04W 84/12 370/338 |
| 2005/0221866 A1 | 10/2005 | Huang et al. | |
| 2007/0032219 A1 | 2/2007 | Rudolf | |
| 2009/0143065 A1 * | 6/2009 | Mattila | H04L 41/06 455/423 |
| 2010/0103042 A1 | 4/2010 | Bishop et al. | |

(Continued)

OTHER PUBLICATIONS

Iridium Satellite LLC, "Iridium Extreme", Jun. 24, 2013.

(Continued)

*Primary Examiner* — Cong Tran
(74) *Attorney, Agent, or Firm* — Baker Botts L.L.P.

(57) ABSTRACT

In one implementation, a request to initiate emergency communications is received at a wireless local area network hotspot. A number of mobile communication devices connected to the wireless local area network hotspot and location information of the wireless local area network hotspot are determined. A distress message is generated that includes the number of mobile communication devices connected to the wireless local area network hotspot and the location information. The distress message is transmitted to a contact address for an emergency contact.

36 Claims, 6 Drawing Sheets

(56) References Cited

U.S. PATENT DOCUMENTS

| | | |
|---|---|---|
| 2010/0306797 A1 | 12/2010 | Curran |
| 2012/0014316 A1 | 1/2012 | Rahman |
| 2012/0046068 A1* | 2/2012 | Katpelly ............ G06Q 30/0204 |
| | | 455/550.1 |
| 2012/0129569 A1* | 5/2012 | Courtney ............... G08B 21/10 |
| | | 455/550.1 |
| 2013/0237148 A1* | 9/2013 | McCann ............... H04W 4/008 |
| | | 455/41.1 |
| 2014/0118140 A1 | 5/2014 | Amis |
| 2014/0273911 A1* | 9/2014 | Dunn ...................... H04W 4/22 |
| | | 455/404.1 |
| 2014/0286198 A1 | 9/2014 | Montemurro et al. |
| 2014/0295894 A1 | 10/2014 | Annamalai |
| 2015/0106770 A1* | 4/2015 | Shah ....................... H04M 1/64 |
| | | 715/863 |
| 2015/0302483 A1 | 10/2015 | Wilson |
| 2016/0057596 A1* | 2/2016 | Thompson .............. H04W 4/22 |
| | | 455/404.1 |

OTHER PUBLICATIONS

National GMDSS Implementation Task Force, "Newsletter and Summary Record of May 19, 2011 Meeting", May 19, 2011.
Radiot Technical Communications for Maritime Services (RTCM), "Beacon Manufacturers Workshop 2011", 2011.

\* cited by examiner

EMERGENCY COMMUNICATIONS FROM A LOCAL AREA NETWORK HOTSPOT

RELATED APPLICATIONS

This application is a Continuation of U.S. application Ser. No. 14/584,259, filed Dec. 29, 2014, the entire content of which is incorporated herein by reference.

TECHNICAL FIELD

The disclosure relates generally to emergency communications from a local area network hotspot.

SUMMARY

According to one implementation of the disclosure, a request to initiate emergency communications is received at a wireless local area network hotspot. A number of mobile communication devices connected to the wireless local area network hotspot and location information of the wireless local area network hotspot are determined. It is also determined whether the wireless local area network hotspot has been loaded with a contact address for an emergency contact. A distress message is generated that includes the number of mobile communication devices and the location information. The distress message is transmitted to the contact address for the emergency contact.

According to another implementation of the disclosure, a wireless local area network hotspot is loaded with a contact address for an emergency contact.

According to yet another implementation of the disclosure, a wireless local area network hotspot is configured to enable mobile communication devices connected to the wireless local area network hotspot to communicate with a satellite communications network. The wireless local area network hotspot includes a satellite communications subsystem configured to connect the wireless local area network hotspot to a satellite communications network and a wireless local area network hotspot subsystem configured to provide a wireless local area network. In addition, the wireless local area network hotspot includes one or more processing elements configured to execute instructions received from computer-readable storage and computer-readable storage storing instructions that, when executed by the one or more processing elements, cause the wireless local area network hotspot to process a received request to initiate emergency communications, determine a number of mobile communication devices connected to the wireless local area network hotspot via the wireless local area network hotspot subsystem and location information of the wireless local area network hotspot, generate a distress message including the number of mobile communication devices connected to the wireless local area network hotspot and the location information, and transmit, using the satellite communications subsystem, the distress message to a designated emergency contact address via the satellite communications network.

Other features of the present disclosure will be apparent in view of the following detailed description of the disclosure and the accompanying drawings. Implementations described herein, including the above-described implementations, may include a method or process, a system, or computer-readable program code embodied on computer-readable media.

BRIEF DESCRIPTION OF THE DRAWINGS

For a more complete understanding of the present disclosure, reference now is made to the following description taken in connection with the accompanying drawings.

DETAILED DESCRIPTION

Figure 1:
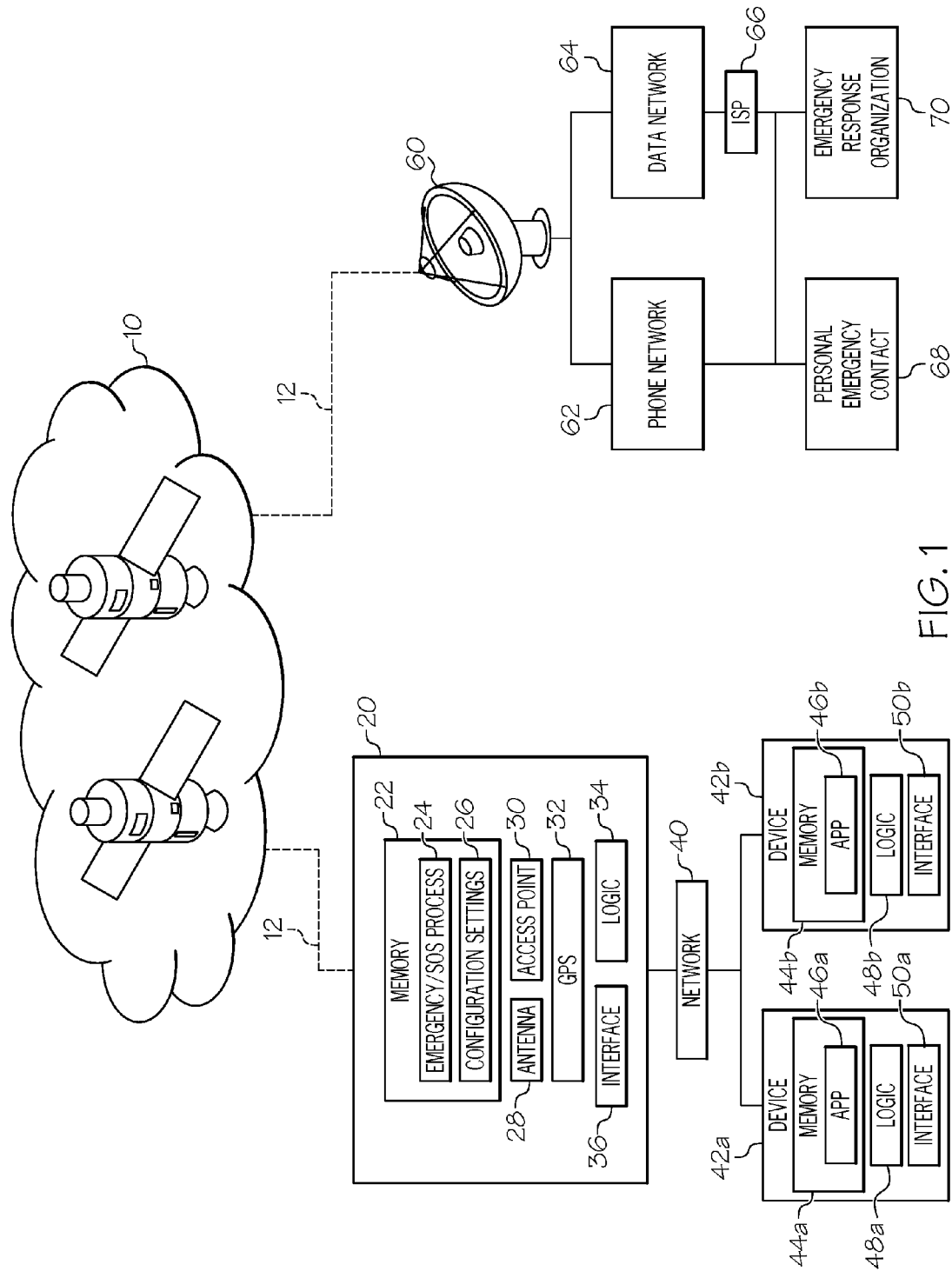
FIG. 1 is a block diagram of a wireless communication system in accordance with a non-limiting implementation of the present disclosure.

Portable satellite-enabled wireless local area network hotspots may enable voice and data communications from any location around the globe. For example, these devices may provide a local wired/wireless area network to which nearby communication devices can connect in order to gain access to another network, such as one provided by an internet service provider ("ISP") or voice communication telephone network, via a satellite communication link or network. In one particular example, a portable satellite-enabled wireless local area network hotspot may be configured to interface with the Iridium® satellite communications network and also may provide a local wired/wireless area network through which nearby communication devices connected to the portable satellite-enabled wireless local area network can access the Iridium® satellite communications network. These devices may be particularly useful in regions where other wireless communication systems are not available. For example, satellite-enabled wireless local area network hotspots may have satellite coverage and enable communications for devices connected to the hotspots in remote areas that may not have traditional communication infrastructure, such as cellular network towers, base stations, or the like.

In certain implementations, communication devices like smartphones, tablet computers, laptop computers and other computing devices, connect to wireless local area network hotspots via Wi-Fi™, BLUETOOTH™, or similar wireless communication technologies. Wireless local area network hotspots may include a satellite communications device that provides a link to a satellite-based communication network, a local area network access point or the like that provides a local area wireless and/or wired network, and a router (e.g., that routes communications to/from devices connected to the local area network and/or across the satellite-based communication network). Connected devices can communicate to remote devices via the link to the satellite-based communication network provided by the satellite-enabled hotspot. Further, wireless local area network hotspots may be equipped with one or more processors and/or memory capable of executing instructions and performing logic operations.

In some implementations, wireless local area network hotspots may provide capabilities to assist search and rescue ("SAR") teams in coordinating rescue efforts during emergency situations in areas nearby the wireless local area network hotspots. Wireless local area network hotspots may additionally be programmed with or otherwise provide other system functions, such as voice call routing, signal encryption, security mechanisms, and the like.

In some implementations, an application executing on a connected device may provide an interface to enable configuring and/or communicating with and/or via the hotspot. For example, the interface may enable configuration of emergency alert settings and emergency communications services. As another example, the interface may enable configuration of various communication preferences. As still another example, the interface may enable transmission and reception of voice communication calls.

With reference to FIG. 1, a wireless communication system is illustrated according to a non-limiting implementation of the present disclosure. The system includes satellites 10, wireless local area network hotspot 20, local area network 40, devices 42a-b (such as, for example, smartphones, tablet computers, laptop computers, etc.), ground station 60, and phone and data networks 62-64. In some implementations, satellites 10 may be part of a constellation of cross-linked communication satellites (e.g., a low earth orbit (LEO) satellite constellation) that uses the satellite cross links to route communications across the satellite constellation to/from ground station 60. In other implementations, one or more satellites 10 may not be cross-linked to any other satellites but instead may provide a "bent pipe" architecture for routing communications to/from ground station 60. Furthermore, in some implementations, an internet service provider ("ISP") 66 may provide devices (e.g., devices connected to phone network 62, data network 64, and/or local area network 40) with access to the Internet.

The satellite-enabled communication network illustrated in FIG. 1 allows communications between devices connected to wireless local area network hotspot 20 and endpoints on networks 62-64 through one or more satellites 10. The wireless local area network hotspot 20 does this by creating a wireless connection to networks 62-64 through satellite links 12 and one or more satellites 10, hosting a local area network 40, and permitting nearby devices 42a-b to connect to network 40 via access point 30. Meanwhile, ground station 60 via satellite link 12 provides a communication interface between one or more satellites 10 and terrestrial communication networks like phone network 62 and data network 64. In some implementations, local area network hotspot 20 may have dimensions and weight that make local area network hotspot convenient for a person to carry and bring along with the person. For instance, in one example implementation, local area network hotspot may be approximately 4.5 inches by 3.25 inches by 1.25 inches and weigh approximately 11 ounces. Additionally or alternatively, the local area network hotspot may be battery powered, thereby enabling the local area network hotspot to operate without being plugged into an electrical network. In such implementations, then, local area network hotspot 20 may be a particularly convenient device to provide access to the satellite based communication network to mobile users of smartphones, tablet computers, laptop computers and the like that are not themselves configured to be able to access the satellite based communication network.

Local area network hotspot 20 includes memory 22, antenna 28, access point 30, and global positioning system ("GPS") device 32. Antenna 28 is configured to establish a connection with one or more satellites 10 to enable the exchange of communications between local area network hotspot 20 and the one or more satellites 10. Meanwhile, access point 30, which itself may include one or more antennas, is configured to provide a wireless and/or wired local area network 40 to which devices in proximity of local area network hotspot 20 can connect. In some implementations, local area network hotspot 20 may generate a wireless local area network 40 that can be accessed wirelessly by devices within approximately 100 meters of local area network hotspot 20.

In some implementations, antenna 28 may be one component of a satellite communications subsystem within local area network hotspot 20 that enables local area network hotspot 20 to communicate with one or more satellites 10. In addition to antenna 28, such a satellite communications subsystem may include one or more transceivers or one or more transmitters and one or more receivers for processing communications to be transmitted to and received from satellite(s) 10. Additionally or alternatively, such a satellite communications subsystem may include one or more modems for demodulating communications received from satellite(s) 10 and/or modulating communications to be transmitted to satellites 10. Satellite communication subsystem also may include additional or alternative componentry that enables local area network hotspot 20 to communicate with satellite(s) 10 including, for example, one or more amplifiers, circuitry or components for encoding/decoding or encrypting/decrypting communications, etc.

Access point 30 may be a component of (or itself may be) a wireless local area network hotspot subsystem that provides a wireless and/or wired local area network over which connected devices can communicate with local area network hotspot 20, which, in turn, enables connected devices to communicate with other devices through satellite(s) 10.

As used herein, references in the present disclosure to local area network hotspots or wireless local area network hotspots may refer to satellite-enabled terminals that provide devices with access to a wireless and/or wired local area network that also are capable of receiving data from and transmitting data to one or more satellites that provide a satellite communication network. For example, such local area network hotspots may provide wireless local area networks via, for example, the Wi-Fi™ or BLUETOOTH™ standard. Additionally or alternatively, such local area network hotspots may provide wired local area networks via, for example, ETHERNET™, USB™ or other physical connections. In this manner, such local area network hotspots may provide devices connected to the local area network with access to one or more other networks through a satellite communication network.

Devices 42a-b include memory 44a-b and application 46a-b. Devices (e.g., devices 42a-b) may connect to network 40 using a wireless or wired data connection. For example, wireless local area network hotspot 20 may be configured to host a Wi-Fi™ local area network 40, and device 42a may use the Wi-Fi™ wireless communication protocol to connect to network 40 via access point 30 on wireless local area network hotspot 20.

By hosting network 40 and enabling devices 42a and 42b to access terrestrial networks like phone network 62 and data network 64, wireless local area network hotspot 20 may enable devices 42a and 42b to access the Internet (e.g., via data network 64) and to conduct voice calls (e.g., voice over Internet protocol (VOIP) calls and the like) and short message service (SMS) text messages and the like In some implementations, applications 46a-b installed on devices 42a-b may facilitate communications between devices 42a-b and local area network hotspot 20. For example, in some implementations, applications 46a-b may be configured to properly format and otherwise route communications to and/or from local area network hotspot 20. As such, applications 46a-b may enable devices 42a-b to access the Internet via local area network hotspot 20. Additionally or alternatively, in some implementations, applications 46a-b may enable devices 42a-b to conduct voice calls and/or send SMS or other text messages through local area network hotspot 20. For example, in one implementation, local area network hotspot 20 may be provisioned with a unique telephone number. When a remote user desires to place a voice call or send a text message to a device connected to local area network hotspot 20, the remote user may place the call or send the text message to the local area network hotspot 20. The local area network hotspot 20 may receive the phone call or text message, determine if any devices currently are connected to the local area network hotspot 20 and, if so, enable one or more of the devices connected to the local area network hotspot 20 to receive the call or text message via an application like application 46a-b.

Placing a voice call or sending a text message from one of devices 42a-b may involve a related workflow. For example, in some implementations, applications 46a-46b may be configured to initiate voice calls and text messages through local area network hotspot 20. In such implementations, a user that desires to place a voice call or send a text message from device 42a may interact with application 46a to input the phone number or other network address of the desired recipient of the voice call or text message. Application 46a then may communicate with local area network hotspot 20 and instruct local area network hotspot 20 to place a voice call or send a text message to the desired recipient on behalf of device 42a.

Additionally or alternatively, devices connected to network 40 like devices 42a-b may use applications 46a-b to configure certain settings on local area network hotspot 20, such as, for example, configuration settings 26. In some implementations, devices 42a-42b may use applications 46a-b to store or otherwise record emergency contact information and/or to register local area network hotspot 20 with an emergency monitoring organization. For example, devices 42a-42b may use applications 46a-b to store or otherwise record one or more telephone numbers or other network addresses (e.g., email addresses, URLs, etc.) for one or more emergency contacts (e.g., personal emergency contact 68 or emergency response organization 70).

In certain implementations, wireless local area network hotspot 20 may be configured to provide an Emergency Alert/SOS mode (e.g., during an emergency situation), as described in greater detail below. This Emergency Alert/SOS mode may be particularly useful to users who use local area network hotspot 20 as a portable device through which to access the satellite-enabled communication network using smartphones, tablet computers, laptops, and the like that are not otherwise configured to access the satellite-enabled communication network from remote locations that may not otherwise be served by terrestrial communication infrastructure like cellular networks. For such users, the Emergency Alert/SOS mode may enable a call or other request for help to be made in a situation whether it otherwise may be difficult to contact the outside world.

For example, a user may use interface 36 on local area network hotspot 20 to cause local area network hotspot 20 to enter an Emergency Alert/SOS mode. Additionally or alternatively, a user may use interface 50a on device 42a to interact with application 46a to cause local area network hotspot 20 to enter an Emergency Alert/SOS mode.

When the Emergency Alert/SOS mode is triggered, local area network hotspot 20 may initiate a countdown during which the Emergency Alert/SOS mode may be canceled (e.g., before the local area hotspot sends any emergency communications, as described in greater detail below). Additionally or alternatively, in certain implementations, when a user uses device 42a to interact with application 46a to cause local area network hotspot 20 to enter the Emergency Alert/SOS mode, application 46a itself may initiate a countdown during which the Emergency Alert/SOS mode may be cancelled before device 42a sends a request to the local area hotspot 20 to enter the Emergency Alert/SOS mode.

Once the countdown completes, logic 34 may load and/or execute process 24 in memory 22. Process 24 may determine if any devices currently connected to network 40 (e.g., devices 42a-b) are communicating via the satellite-enabled communications network (e.g., conducting voice calls, accessing the Internet, etc.), and may terminate (or temporarily postpone) any data transmission/reception, voice calls, or any other non-emergency communications over satellite link 12 involving such devices. For example, if there are any open data or voice call sessions, process 24 may close such sessions. Depending on the implementation, process 24 may be implemented in a number of different ways. For example, process 24 may be implemented as one or more of an embedded mode/feature within a separate application, a background process/service, a dedicated stand-alone application, and/or any other type of executable program for communicating and managing communications, for example during an Emergency Alert/SOS mode.

Thereafter, or in parallel, local area network hotspot 20 may transmit an emergency alert message to an emergency monitoring organization (e.g., emergency response organization 70) and/or other emergency contact (e.g., personal emergency contact 68) via the satellite enabled communications network, for example as described in greater detail below. As described above, contact information for such emergency monitoring organizations or other emergency contacts may be recorded in configuration settings 26. By terminating (or temporarily postponing) data transmission/reception, voice calls, or any other non-emergency communications and thereafter, or in parallel, transmitting one or more emergency alert messages, local area network hotspot 20 may effectively prioritize the emergency alert message(s) over non-emergency communications.

In some implementations, when the Emergency Alert/SOS mode is triggered, local area network hotspot 20 may determine the number of devices currently connected to network 40 and include an indication of the number of devices currently connected to network 40 in the emergency alert message sent by the local area network hotspot 20 to the emergency monitoring system and/or other emergency contact. The number of devices connected to network 40 when the Emergency Alert/SOS mode is triggered and/or when the emergency alert message is sent may be helpful information to an emergency responder, for example, because it may give the emergency responder insight into the number of people impacted by the emergency and in need of help. For instance, if the emergency alert message indicates that there are five devices connected to the local area network hotspot 20, the emergency responder may infer that there are at least 5 people impacted by the emergency and in need of help. This information may help the emergency responder prepare for any rescue attempt. Alternatively, if the emergency alert message indicates that there are no devices connected to the local area network hotspot 20, the emergency responder may be better informed about the options available to the emergency responder for replying to the emergency alert message. For example, in implementations in which the local area network hotspot 20 has no interface for displaying or otherwise rendering a message locally at the local area network hotspot 20 itself, an emergency responder may determine that replying to an emergency alert message when no devices are connected to the local area network hotspot 20 may not be worth the effort and instead may focus his/her efforts on mobilizing a rescue effort for the emergency situation.

In some implementations, local area network hotspot 20 may transmit a single emergency alert message in response to the Emergency Alert/SOS mode being triggered. In other implementations, while local area network hotspot 20 is operating in the Emergency Alert/SOS mode, the local area network hotspot 20 may transmit multiple emergency alert messages (e.g., periodic emergency alert messages until some triggering condition occurs, such as, for example, an instruction to exit the Emergency Alert/SOS mode is received). By terminating (or temporarily postponing) data transmission/reception via the satellite enabled communications network involving devices 42a-42b in response to the Emergency Alert/SOS mode being triggered, local area network hotspot 20 effectively may prioritize emergency communications over communications involving devices 42a-42b.

Applications 46a-b may enable users of devices 42a-42b to connect devices 42a-42b to process 24 to set up further configuration settings 26 regarding emergency situations. For example, in a configuration step, settings such as emergency contact information and emergency response organizations may be set up using interface 50a-b to interact with applications 46a-b. These settings may be stored as configuration settings 26 and may be used by process 24 during an emergency situation to contact appropriate parties. Other configuration settings may include frequency of distress message transmission, content of the distress message, structure of the distress message, number of messages, recipients of distress messages, type of the distress message, e.g., voice call, page, text message, email, or the like. Many other settings may be configured using device applications 46a-b.

When the Emergency Alert/SOS mode is triggered, process 24 may, additionally or alternatively, determine information for each device 42a-b connected to network 40. For example, the process 24 may determine the number and/or type of devices currently connected to network 40. For example, if a tablet and a smartphone are connected to network 40 when the Emergency Alert/SOS mode is triggered, process 24 may identify that a tablet and a phone are connected to network 40. This information may be used to generate information to include in a distress message to provide further information to an emergency response agency or other recipient of the distress message.

As another example, process 24 may, additionally or alternatively, determine geo-location information. For example, process 24 may access location information for local area network hotspot from GPS device 32. When the Emergency Alert/SOS mode is triggered, logic 34 may operate GPS device 32 to acquire GPS satellite signals and calculate a location position for the local area network hotspot 20. In some implementations, alternative geolocation determination technologies may be employed to determine the location of the local area network hotspot 20. For example, the GLONASS navigation system, the Beidou navigation system, and/or the Galileo navigation system may be used to determine the location of the local area network hotspot 20. After process 24 determines geo-location information for the local area network hotspot 20, the local area network hotspot 20 may transmit updated geo-location data for the local area network hotspot 20 to the emergency contact and/or emergency response organization via a one-time or periodic emergency alert message. Obtaining and transmitting location information for the local area network hotspot 20 to an emergency response organization and/or an emergency contact in this fashion (e.g., one time or intermittently/periodically) may help update an emergency response team with the location, direction and/or rate of travel of the local area network hotspot 20 in an emergency situation.

In one implementation, if process 24 is unable to obtain definitive geo-location information for local area network hotspot 20 from GPS device 32, process 24 may, additionally or alternatively, use other means of obtaining a location estimate for local area network hotspot 20. For example, process 24 may access timing (or other) signals from one or more of satellites 10 in order to estimate geo-location information for local area network hotspot 20 (e.g., using satellite 10 triangulation techniques) and/or process 20 may use other information available through the communication network to estimate the location of the local area network hotspot 20. In certain implementations, other location estimation techniques may be used, such as proximity to known wireless networks, electro-magnetic fields, or the like.

Process 24 may use the collected information and configuration information to generate and send one or more emergency messages via the satellite based communication network 10, for example, to an emergency monitoring organization (e.g., emergency response organization 70), a designated emergency contact (e.g., personal emergency contact 68), etc. In some implementations, the emergency message may be a text message. Additionally or alternatively, the emergency message may be a voice call or a page instructing a recipient of the message to call a predetermined number back. For example, the local area network hotspot 20 may have a telephone number associated with it and the local area network hotspot may be operable to send and receive voice calls over the satellite based communications network.

The local area network hotspot 20 may be capable of sending and receiving emergency alert messages over the satellite based communications network using any of a number communication protocols including Internet protocol ("IP") messaging, short message service ("SMS") messaging, VOIP calls, any other type of communication protocols enabled by local area network hotspots, or any suitable combination(s) thereof. For example, configuration settings 26 may specify any combination of messaging protocols for transmission of messages to emergency contacts, emergency response services, and/or any other parties.

When the local area network hotspot 20 is operating in the Emergency Alert/SOS mode, process 24 may transmit emergency messages at a predetermined periodic frequency. For example, when the local area network hotspot 20 is operating in the Emergency Alert/SOS mode, process 24 may transmit emergency messages every five minutes according to configuration settings 26.

Local area network hotspot 20 may be configured to receive voice calls when operating in Emergency Alert/SOS mode. However, in some implementations, when operating in Emergency Alert/SOS mode, local area network hotspot 20 only may allow calls received from certain designated points of origin (e.g., a phone number associated with an emergency monitoring organization such as emergency response organization 70 or a designated emergency contact such as personal emergency contact 68) to be completed. For example, an emergency responder (e.g., working for emergency response organization 70) may receive an emergency alert message from local area network hotspot 20. The emergency responder may call local area network hotspot 20 at one or more of a registered telephone number for the device, or a telephone number transmitted with the emergency message originally transmitted by the local area network hotspot 20. The voice call from the emergency responder may be received at the satellite communication device 20. If one or more devices (e.g., devices 42a-42b) are connected to network 40, process 24 enable the call to be completed through one of the connected devices. For example, if process 24 detects that device 42a is connected to network 40 and configured to receive voice calls, process 24 may enable the incoming voice call to be completed via device 42a. If, however, process 24 does not detect any connected devices on network 40, a notification interface on local area network hotspot 20, such as a flashing light, textual display, or the like, may show that an incoming call is being received. Similarly, text messages from the emergency responder may be received and forwarded by local area network hotspot 20 to connected devices or stored at local area network hotspot 20 for later retrieval.

Figure 2:
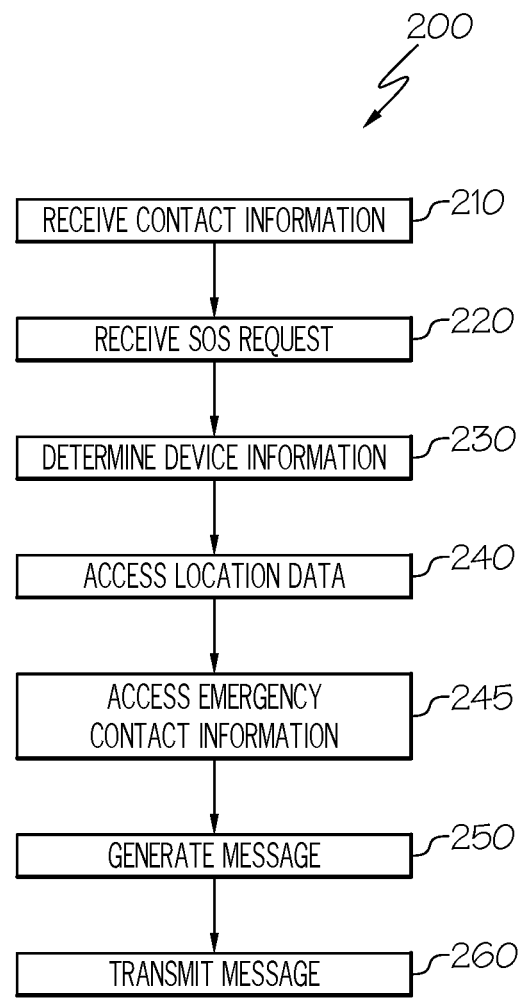
FIG. 2 is a flow chart of a method for emergency communication using a wireless local area network hotspot in accordance with a non-limiting implementation of the present disclosure.

With reference to FIG. 2, a flow chart of a method for emergency communication using a wireless local area network hotspot, such as, for example, local area network hotspot 20 of FIG. 1, is illustrated in accordance with a non-limiting implementation of the present disclosure. At step 210, emergency contact information is received at a wireless local area network hotspot. In some implementations, the wireless local area network hotspot may be preprogrammed with emergency contract information. For example, the wireless local area network hotspot may be preprogrammed with contact information (e.g., a phone number or other network address) for an emergency monitoring organization like the GEOS service provided by Travel Safety Group Limited. Additionally or alternatively, the wireless local area network hotspot may be configured to enable users to provide alternative or additional emergency contact information to be stored in the wireless local area network hotspot. For example, a user may instruct an application on his/her smartphone, tablet computer or other device connected to the wireless local area network hotspot to cause the wireless local area network hotspot to record emergency contact information for an alternative emergency monitoring organization and/or emergency contact information for an alternative or personal emergency contact, such as, for example, a family member, a business colleague, etc.

At step 220, a request to initiate emergency communications is received at a wireless local area network hotspot. For example, a user may instruct an application on his/her smartphone, tablet computer or other device connected to the wireless local area network hotspot to request that the wireless local area network hotspot enter an Emergency Alert/SOS mode, and the application may send a request to the wireless local area network hotspot to enter the Emergency Alert/SOS mode.

In certain implementations, in response to receiving the request to initiate emergency communications, the wireless local area network hotspot may initiate a false alarm prevention process to ensure that the user actually desires to begin sending emergency messages and/or alerts to emergency contacts and/or emergency responders. For example, a countdown may be initiated in which an interface display alerts the user that emergency contacts will be contacted after a predetermined amount of time, such as, for example 20 seconds. The user may cancel the emergency session at this time or at any time after invocation of the emergency session, for example, via an application installed on the user's device connected to the wireless local area network hotspot or via an input mechanism on the wireless local area network hotspot itself.

In certain implementations, in response to receiving the request to initiate emergency communications, the wireless local area network hotspot may suspend, terminate, postpone, or otherwise delay communications through the wireless local area network hotspot that involve devices connected to the local area network hotspot. Doing so may enable the wireless local area network hotspot to ensure that emergency messages transmitted by the wireless local area network are given the highest priority and/or enable the wireless local area network to preserve battery life during the emergency situation. For example, if a connected device is downloading a web page, conducting a voice call, or sending intermittent text messages when the request to initiate emergency communications is received, these communications may be terminated for a period of time while the emergency situation continues. Thus, bandwidth may be preserved for important emergency communications and battery life may be prolonged.

At step 230, the wireless local area network hotspot determines various information about devices currently connected to the local area network hotspot. In some implementations, the wireless local area network hotspot determines a number of devices currently connected to the wireless local area network hotspot. For example, several wireless communication devices may be connected to the local area network hotspot. The wireless local area network hotspot determines the number of these wireless communication devices that are connected.

In certain implementations, the wireless local area network hotspot may obtain further or alternative information about each connected device. For example, each connected device may be discoverable and may run an application or process that communicates the device type and/or other specifics about the device to the wireless local area network hotspot. For example, packets sent by the connected devices to the wireless local area network hotspot may have embedded information identifying the type of the sending device (e.g., smartphone, tablet computer, or laptop computer), the operating system of the sending device, etc. Further, the wireless local area network hotspot may assign local IP or other network addresses for each connected device and may access such local address information at step 230.

In certain implementations, an application running on each connected device may establish a device type during a configuration phase. For example, during a device registration and configuration phase, the type of device, e.g., APPLE IPHONE™, ANDROID™ tablet, or other identifying information may be collected by the application and transmitted to the wireless local area network hotspot. Further, the local wireless area network hotspot may collect operating system information about connected devices at this time. For example, the wireless local area network hotspot may identify individual connected devices as running IOS™ ANDROID™, WINDOWS™, LINUX™, or other operating systems. The wireless local area network also may obtain further version information for each operating system as well. As another example, mac address, local IP address, global IP address, device owner, device operator, and other information may be collected by the wireless local area network hotspot from the connected devices and stored in, for example, the configuration settings of the wireless local area network hotspot.

At step 240, the wireless local area network hotspot accesses location data for the wireless local area network hotspot. For example, the wireless local area network hotspot may access geo-location information for the wireless local area network hotspot from a GPS chip within the wireless local area network hotspot. In some cases, GPS-based geo-location information for the wireless local area network hotspot may not be available (e.g., because the wireless local area network device is in a location from which it is unable to receive sufficient GPS signals). In such cases, other methods of estimating the location of the wireless local area network hotspot may be used. For example, in the case of the local area network hotspot 20 in FIG. 1, the local area network hotspot may be connected to one or more satellites of a satellite communication network, and the local area network hotspot 20 may estimate the location of the local area network hotspot 20 based on signals (e.g., timing signals) received from one or more of the satellites in the satellite communication network.

At step 245, the wireless local area network hotspot accesses emergency contact information for one or more recipients to whom to send a distress message. For example, the wireless local area network hotspot may determine if emergency contact information, such as a phone number, a network address (e.g., email address) or some other electronic address, for one or more emergency contacts has been recorded with the wireless local area network hotspot. For example, a user can configure the wireless local area network hotspot to store emergency contact information for a particular emergency monitoring organization like a search and rescue emergency response organization and/or a personal emergency contact like a family member or business colleague.

At step 250, the wireless local area network hotspot generates a distress message using, for example, the location information for the wireless local area network hotspot and/or the number of connected devices. In certain implementations, the message may be composed according to a predetermined format. For example, the message may have a format template such as an XML Schema Definition ("XSD") file that may define the format of the message. The XSD may have placeholders for data values. A process may fill in the data value placeholders during message creation. The format and/or syntax file may be generated during the configuration stages and may be stored in or as a configuration file.

As another example, the message may be drafted to specifications set by a standards setting body for emergency messaging. In certain implementations, the message format and content may be fully configurable using an application, web application, or the like on a device connected to the wireless local area network hotspot.

At step 260, the distress message is transmitted to the appropriate contact address(es) for the emergency contact and/or emergency monitoring service registered with the wireless local area network hotspot. As discussed above in connection with FIG. 1, in some implementations, the wireless local area network hotspot provides a satellite link to a satellite communication network over which other voice and/or data networks are accessible. In such implementations, the wireless local area network hotspot may transmit the distress message to the appropriate contact addresses on voice and/or data networks accessible over the satellite communication network by transmitting the distress message across the satellite communication network. In some implementations, the wireless local area network hotspot may continue to send distress messages to the appropriate emergency contact addresses (e.g., periodically or intermittently) until the wireless local area network hotspot receives a request to stop transmitting distress messages and/or to exit the Emergency Alert/SOS mode.

Similarly, in some implementations, the wireless local area network hotspot may continue to prevent communications involving devices connected to the wireless local area network from being transmitted and/or received via wireless local area network hotspot until the wireless local area network hotspot receives a request to exit the Emergency Alert/SOS mode. In alternative implementations, following the transmission of the distress message, previously active voice and/or data connections involving connected devices that the wireless local area network hotspot interrupted may be one or more of restarted, enabled, and un-paused. However, such resumed connections again may be interrupted if the wireless local area network hotspot determines to transmit another distress message.

Figure 3:
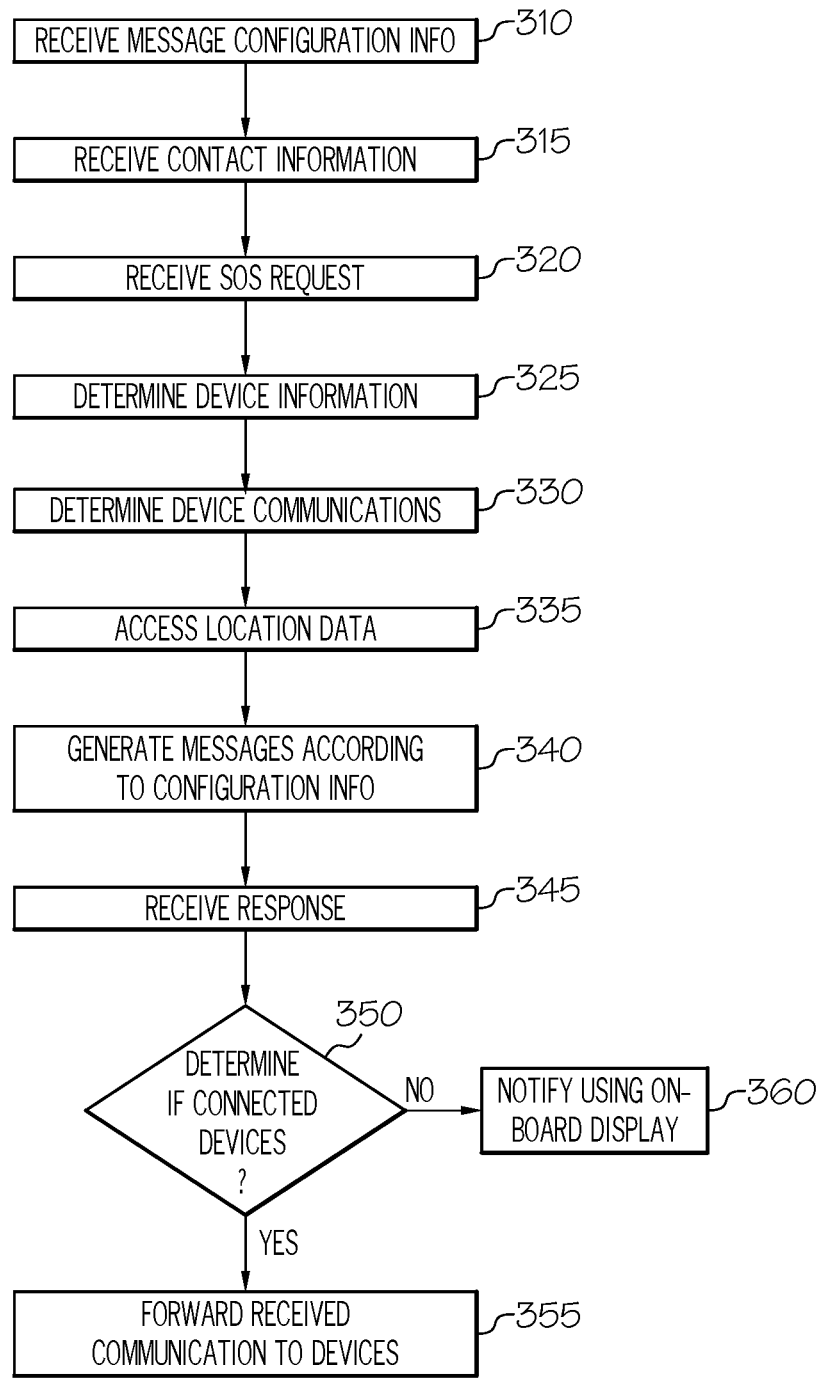
FIG. 3 is a flow chart of a method for emergency communication using a wireless local area network hotspot in accordance with a non-limiting implementation of the present disclosure.

With reference to FIG. 3 a flow chart of a method for emergency communication using a wireless local area network hotspot, such as, for example, local area network hotspot 20 of FIG. 1, is illustrated in accordance with a particular non-limiting implementation of the present disclosure. At step 310, emergency message configuration information, such as the number of messages to be sent in the event of an emergency, the type of messages to be sent in the event of an emergency, the content of the messages to be sent in the event of an emergency, the structure of the messages to be sent in the event of an emergency, and the like, is received at a wireless local area network hotspot and stored in a memory.

At step 315, contact information for one or more emergency contacts and/or one or more emergency response providers is received and stored in a memory at the wireless local area network hotspot. At step 320, an SOS request is received at the wireless local area network hotspot. For example, the wireless local area network hotspot may receive the request in response to a user pressing a button on the wireless local area network hotspot itself or in response to a user interacting with a user interface on a connected device to initiate an SOS/Emergency Alert session.

At step 325, the wireless local area network hotspot determines device information for some or all devices connected to the wireless local area network hotspot. For example, the wireless local area network hotspot may determine device information such as the number of connected devices, the types of one or more of the connected devices, and/or other device-specific information such as a logged in user or other information for some or all of the connected devices.

At step 330, the wireless local area network hotspot terminates communications from/to the devices that are connected to the wireless local area network hotspot and that currently are communicating through the wireless local area network hotspot (e.g., across a satellite communication network linked to by the wireless local area network hotspot). In certain implementations, the terminated communications may be re-initiated automatically after transmission and/or receipt of emergency notifications/communications or some other triggering event. In other implementations, the terminated communications may not be reinitiated automatically.

At step 335, the wireless local area network hotspot accesses location data for the wireless local area network hotspot, for example, via either a GPS module or another method of geo-location information determination.

At step 340, the wireless local area network hotspot generates one or more messages according to the configuration information and/or the device information. For example, if contact information for three different emergency contacts is represented in the configuration information stored in memory of the wireless local area network hotspot, the wireless local area network hotspot may generate three messages, one for each emergency contact represented in the configuration information stored in memory of the wireless local area network hotspot. In some implementations, the messages may contain callback information for the wireless local area network hotspot, for example, to enable an emergency response organization or emergency contact to respond to the wireless local area network hotspot.

The messages may also contain device information for some or all of the connected devices. For example, the messages may include information indicating that three phones and two computers are connected to the wireless local area network hotspot. This may give emergency responders an idea of the number of people that may require emergency response services. Such information may also provide an idea of preferred communication means for responding to users of the wireless local area network hotspot during the emergency situation. For example, in implementations where the wireless local area network hotspot itself is not capable of conducting voice calls and instead routes voice calls to connected devices, if an emergency message originally sent by the wireless local area network hotspot to an emergency response service indicates that no devices are connected to the wireless local area network hotspot, the emergency response service may not waste valuable time attempting to initiate a voice call with users of the wireless local area network hotspot.

Other inferences may be drawn from the information presented in the emergency messages and should not be limited by the scope of the present disclosure. For example, a particular user or group of users may register with an emergency monitoring service as being associated with a particular wireless local area network hotspot. In such cases, when the emergency monitoring service receives an emergency message identified as being from the particular wireless local area network hotspot, the emergency monitoring service may infer that the particular user or group of users are co-located with the wireless local area network hotspot and, therefore, impacted by the emergency situation.

As another example, the wireless local area network hotspot may store information about a particular user or group of users of the local area network hotspot and transmit such information about the particular user or group of users to the emergency monitoring service in response to receiving the SOS request. Additionally or alternatively, in implementations in which the SOS request can be triggered by a device connected to the wireless local area network hotspot, the triggering device may provide information about the user of the triggering device and/or other co-located users (e.g., based on information stored at the triggering device and/or information input by the user in connection with generating the SOS request at the triggering device).

By receiving such information identifying or enabling identification of one or more individuals potentially impacted by the emergency situation, emergency responders may be able to infer certain information about individuals potentially impacted by the emergency situation (e.g., health ailments, weakness, allergies, current medication regimens, etc.), for example, by cross-referencing the names of the individuals with a registration database, a health records database, or the like. Thus, emergency responders may be better equipped to handle the number and type of medical emergencies at the rescue location even if they are unable to communicate directly with the individuals impacted by the emergency situation. Furthermore, such detailed information stored in the registration database may not be practical to transmit via a remote device during an emergency situation, for example, because it may increase the length of the emergency message, and the likelihood of successful transmission of relatively long messages may be less than the successful transmission of relatively short messages, especially during harsh weather or in the face of other interference with the satellite signals. Further, sending relatively long messages may drain battery resources more quickly than sending relatively short messages.

At step 345, the wireless local area network hotspot receives a response to an emergency message. The received response may be in the form of a received text message or some other form of electronic message. The message may be received from a phone network, a data network, or any other form of network. In certain implementations, the received message may be an incoming voice call. In certain implementations, the received message may be an emergency response operator answering a voice call placed during step 340.

At step 350, the wireless local area network hotspot determines whether any devices currently are connected to the wireless local area network hotspot. If devices are connected, the wireless local area network hotspot may route the received response to one or more of the connected devices at step 355. This may enable, for example, communications with an emergency response service, search and rescue service, emergency contact or the like to begin. Alternatively, in some implementations, if the wireless local area network hotspot determines that no devices currently are connected to the wireless local area network hotspot, at step 360, the wireless local area network hotspot may display a notification at the wireless local area network hotspot that indicates that a response has been received and is waiting to be routed to a connected device. For example, the wireless local area network hotspot may illuminate a light emitting diode ("LED") or other light source at the wireless local area network hotspot to indicate that the response has been received and is waiting to be routed to a connected device.

In some implementations, the emergency communications facilitated by a local area network hotspot may be composed to comply with one or more specifications set by, for example, some form of a centralized body. For example, the emergency communications may be composed to meet specifications designed by a working committee led by the Radio Technical Commission for Maritime Services ("RTCM") in the United States or other similar organizations. Such specifications may set standards for emergency communication protocols.

In some implementations, an authentication mechanism may be provided to facilitate the registration of a wireless local area network hotspot with an emergency monitoring organization. In such implementations, the authentication mechanism (or a portion of the authentication mechanism) may be incorporated within an application that executes on a device capable of connecting to the wireless local area network hotspot and that facilitates the exchange of communications between the device and the wireless local area network hotspot. Additionally or alternatively, the authentication mechanism (or a portion of the authentication mechanism) may be incorporated within a website associated with the emergency monitoring organization and/or within the wireless local area network itself.

For example, in one implementation, when a user desires to register the wireless local area network hotspot with an emergency monitoring service, the emergency monitoring service may require the user to access a registration website associated with the emergency monitoring service through a network connection other than a network connection through the wireless local area network hotspot and enter the International Mobile Station Equipment Identity ("IMEI") identifier for the wireless local area network hotspot. Receipt of the IMEI identifier for the device may enable the emergency monitoring service to register the device. In response to receiving an IMEI as part of the registration process as described above, a computing device associated with the registration website may employ an algorithm to convert the received IMEI identifier into an authorization code. For example, the computing device may perform a hashing algorithm on the received IMEI identifier in order to generate the authorization code. The website then may provide the authorization code to the user who input the IMEI identifier for the wireless local area network hotspot into the registration website, for example, by displaying the authorization code on the device from which the registration website was accessed, by sending an email to an email address associated with the user who entered the IMEI identifier for the wireless local area network hotspot into the registration webpage, etc.

The same, similar, or corresponding logic that the registration website used to generate the authorization code from the received IMEI identifier also may be resident on the wireless local area network hotspot. Therefore, when a user attempts to connect a device like a smartphone, a tablet computer, a laptop computer or the like to the wireless local area network hotspot, for example, via an application executing on the device, the wireless local area network and/or the device may prompt the user for the authorization code. The wireless local area network hotspot then may receive the authorization code from the user's device, use the logic to convert the authorization code into an IMEI identifier and confirm that the IMEI identifier matches the IMEI identifier for the wireless local area network hotspot. In the event that the IMEI identifiers match, the wireless local area network hotspot may determine that the wireless local area network hotspot has been successfully registered with the emergency monitoring organization and, in some implementations, this determination may be communicated back by the wireless local area network hotspot to the device attempting to connect to the wireless local area network hotspot. This may enable the application executing on the device to ensure that the wireless local area network hotspot has been properly registered with the emergency monitoring organization even if the device on which the application is executing does not have concurrent access to the registration website or other hosted facilities for the emergency monitoring organization.

Figure 6:
FIG. 6 is a user interface for authenticating the registration of a wireless local area network hotspot with an emergency response service.

With reference to FIG. 6, a user interface of an application executing on a user device for authenticating the registration of a wireless local area network hotspot with an emergency response service is illustrated in accordance with a non-limiting implementation of the present disclosure. The registration may be confirmed without connecting the device on which the application is executing to a data network. In other words, the application may not require direct acknowledgement from the registration website or other computing resources associated with the monitoring service in order to complete the registration. Thus, the registration of the wireless local area network hotspot may be confirmed even in a remote area without access to a terrestrial cellular or data network. As illustrated in FIG. 6, the registration of the wireless local area network hotspot may be confirmed by entering an authorization code (e.g., a five digit authorization code) received from the registration website in a field presented by the application. This authorization code then may be transmitted to the wireless local area network hotspot by the device, and the wireless local area network hotspot then may convert the authorization code into an IMEI identifier. If the IMEI identifier matches the IMEI identifier for the wireless local area network hotspot, the wireless local area network hotspot may determine that the registration of the wireless local area network hotspot has been confirmed and report this determination back to the device.

As described above, in some implementations, applications executing on devices connected to a wireless local area network hotspot may facilitate the exchange of communications between the devices and the wireless local area network hotspot. In such implementations, depending on the types of devices connected to the wireless local area network hotspot and the operating systems that the connected devices run, these applications may be implemented as ANDROID™ applications, iOS™ applications, WINDOWS™ applications, OS X™ applications, or the like. These examples are merely didactic in nature, however, and should not be understood as limiting. For example, the functionality attributed herein to such applications instead may be embodied in a web application or website.

Figure 4:
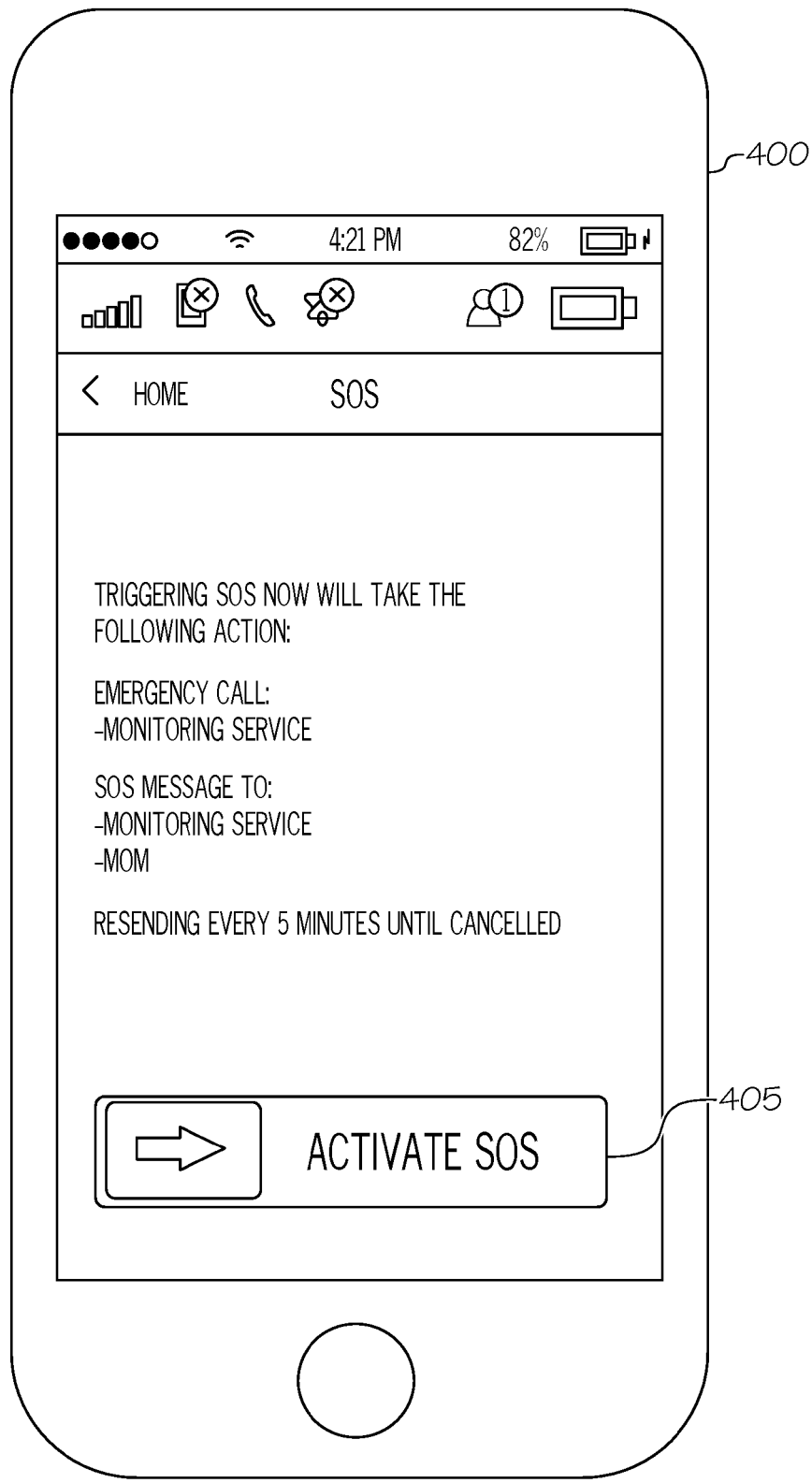
FIG. 4 is a user interface for initiating emergency communications in accordance with a non-limiting implementation of the present disclosure.
Figure 5:
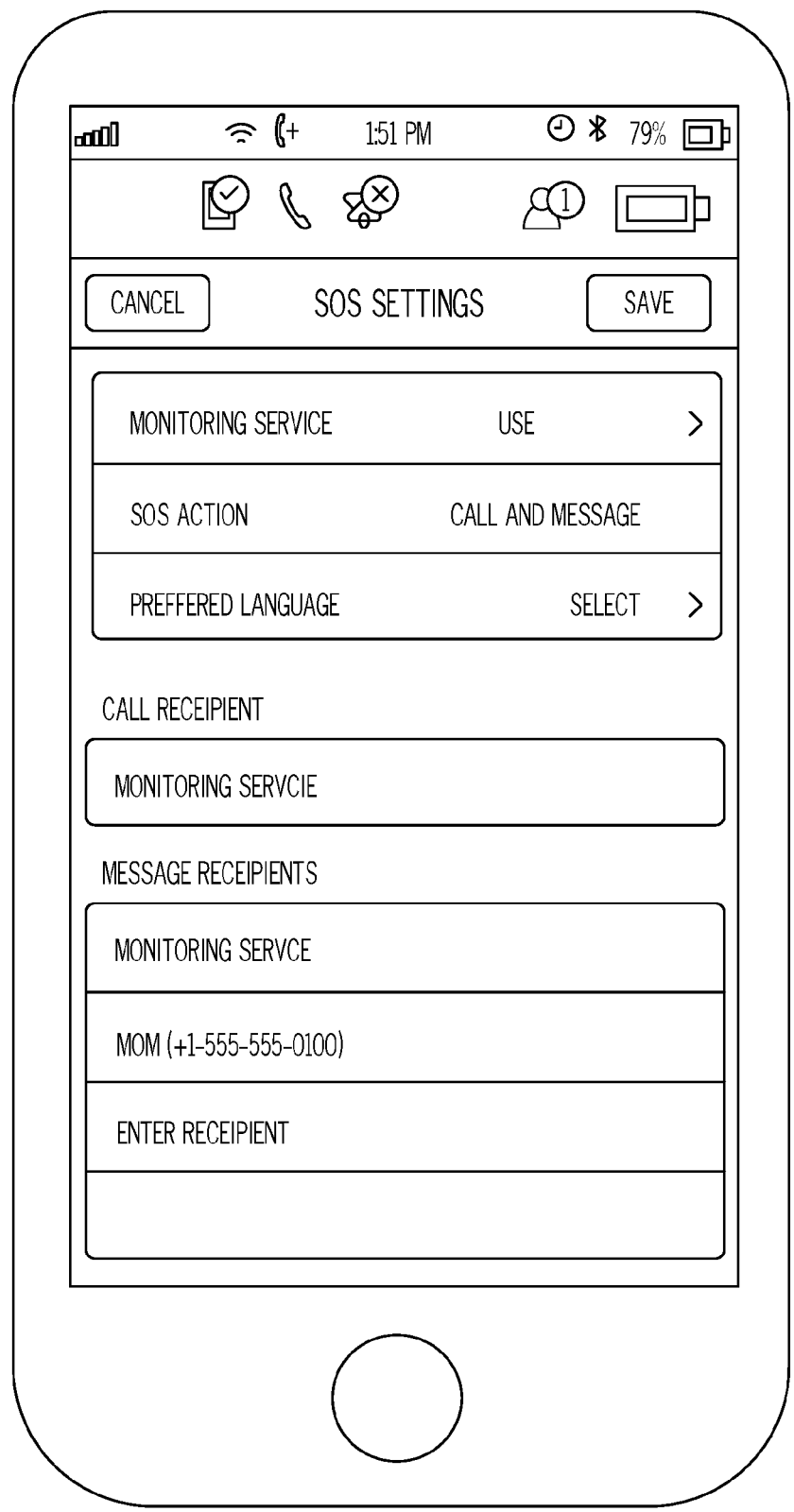
FIG. 5 is a user interface for configuring certain actions to be performed in response to triggering the Emergency Alert/SOS mode is illustrated in accordance with a non-limiting implementation of the present disclosure.

FIGS. 4-5 are examples of user interfaces for such applications. One of ordinary skill in the art will appreciate that the interfaces themselves and the description of steps or features provided below with respect to the interfaces are merely examples. Accordingly, the features of the present disclosure may not be tied to the particular interfaces illustrated and/or described herein.

With reference to FIG. 4, an example user interface is illustrated for initiating emergency communications in accordance with one particular non-limiting implementation of the present disclosure. As illustrated in FIG. 4, an application executing on a device 400 wirelessly connected to a wireless local area network hotspot provides an interface that includes a control 405 configured to enable a user to input a request to enter an Emergency Alert/SOS mode. In the particular example illustrated in FIG. 4, control 405 is configured to enable a user to input a request to enter the Emergency Alert/SOS mode by sliding control 405 horizontally from the left to the right, though many other configurations are possible. In response to user activation of control 405, the application may cause the device on which the application is executing to send a communication to the wireless local area network hotspot requesting that the device enter the Emergency Alert/SOS mode.

As also illustrated in FIG. 4, the example interface displays summary information about the actions that will be performed in response to triggering the Emergency Alert/SOS mode. For example, the example user interface displays a first indication that triggering the Emergency Alert/SOS mode will result in the wireless local area network hotspot automatically placing an emergency voice call to a phone number (or other network address) for a Monitoring Service (e.g., the GEOS emergency monitoring service) and a second indication that triggering the Emergency Alert/SOS mode will result in the wireless local area network hotspot automatically sending text messages (e.g. SMS text messages) to the network addresses (e.g., phone number, email address, etc.) for the Monitoring Service and an emergency contact Mom. In some implementations, when the wireless local area network hotspot causes such an emergency voice call to be placed, the wireless local area network hotspot interacts with the device 400 that is wirelessly connected to the wireless local area network hotspot and that triggered the emergency call to complete the emergency call through the device 400 that triggered the emergency call. In addition, the example user interface displays an indication that one or both of the voice call and the text messages will be automatically resent every 5 minutes until the Emergency Alert/SOS mode is canceled.

As described above, at least some of the actions performed in response to triggering the Emergency Alert/SOS mode may be configured by a user of the wireless local area network hotspot and stored in configuration settings by the wireless local area network hotspot. For example, in some implementations, a user may be able to configure the wireless local area network hotspot to define to which phone numbers or other network addresses automatic emergency voice calls and/or text messages are sent when the Emergency Alert/SOS mode is triggered. In certain implementations, a user may specify configuration sessions by interacting with a device connected to the wireless local area network hotspot. Additionally or alternatively, a user may specify configuration settings via an interface panel of buttons and/or a touchscreen or the like on the wires local area network hotspot.

With reference to FIG. 5, a user interface for configuring certain actions to be performed in response to triggering the Emergency Alert/SOS mode is illustrated in accordance with a non-limiting implementation of the present disclosure. For example, the example user interface includes a first set of fields that enables a user to configure certain interactions with a particular Monitoring Service (e.g., the GEOS emergency monitoring service). In particular the example user interface includes fields that enable a user to specify (1) whether or not the Monitoring Service is to be contacted automatically when the Emergency Alert/SOS mode is triggered, (2) the way in which the Monitoring Service is to be contacted when the Emergency Alert/SOS mode is triggered (i.e., voice call and text message as illustrated in FIG. 5), and (3) an indication of a language that the Monitoring Service should use to response to a communication from the wireless local area network hotspot.

As also illustrated in FIG. 5, the example interface also includes a field that enables a user to specify an emergency contact and/or contact information for an emergency contact to whom an automatic voice call is to be placed when the Emergency Alert/SOS mode is triggered. As illustrated in FIG. 5, the user has specified that an automatic voice call is to be placed to the Monitoring Service when the Emergency Alert/SOS mode is triggered, for example, because the user already has specified that the Monitoring Service is to be contacted by both an automatic voice call and automatic text message when the Emergency Alert/SOS mode is triggered in the user interface fields dedicated to the particular Monitoring Service. In some implementations, an automatic voice call may be placed to only a single emergency contact when the Emergency Alert/SOS mode is triggered. In other implementations, automatic voice calls may be placed to multiple emergency contacts when the Emergency Alert/SOS mode is triggered. In such implementations, the wireless local area network hotspot may enable a user to specify the order in which the automatic voice calls are placed to the emergency contacts.

As further illustrated in FIG. 5, the example interface also includes fields that enable a user to specify one or more emergency contacts and/or contact information for one or more emergency contacts to whom automatic text messages are to be sent when the Emergency Alert/SOS mode is triggered. As illustrated in FIG. 5, the user has specified that automatic text messages are to be sent to both the Monitoring Service and an emergency contact identified as Mom having a phone number of +1 555 555 0100.

As illustrated in FIG. 5, in certain implementations, a user may specify that only text messages are to be sent when the Emergency Alert/SOS mode is triggered, only a voice call is to be placed when the Emergency Alert/SOS mode is triggered, or that text messages are to be sent and a voice call is to be placed when the Emergency Alert/SOS mode is triggered.

After a user specifies configuration settings via the example user interface, the application may cause the device on which the application is executing to send a communication to the wireless local area network hotspot indicating the configuration settings specified by the user, and the wireless local area network hotspot may store the specified configuration settings in memory at the wireless local area network hotspot. Additionally or alternatively, the application also may store the specified configuration settings locally at the device on which the application is running.

In certain implementations, changes can be made to configuration settings locally on a device that is not currently connected to a wireless local area network hotspot. For example, configuration settings may be made or set when the wireless local area network hotspot is shut off or not nearby. Thereafter, when the device later is connected to the wireless local area network hotspot, the device may transfer the changed configuration settings to the wireless local area network hotspot. This may provide the user with the flexibility of configuring a wireless local area network hotspot, for example, without starting up the wireless local area network hotspot.

In certain implementations, if a user does not configure emergency contact information, each user who connects a device to the wireless local area network hotspot may be prompted for such emergency contact information upon connecting to the wireless local area network hotspot until such emergency contact information is provided. In some implementations, if a user has not configured emergency contact information for the wireless local area network hotspot and the Emergency Alert/SOS mode is triggered, the wireless local area network hotspot may transmit one or more emergency communications to a predefined, default emergency contact address, such as, for example, an emergency monitoring service like the GEOS service.

The emergency text messages described herein may be generated in a variety of different formats. For example, in some implementations, an emergency alert message may be composed to be no longer than a single short SMS message. One example of an emergency text message described herein appears below:
EMERGENCY/Lat+51.415950(stdv 00029)/Lon+ 005.424699(stdv 00025)/Alt+062 ft(stdv 00024)/GPS sats 04/2014-02017 15:28UTC/Batt100%/Lang en/2/ [DEVICE TYPE]

This example message may be transmitted by a wireless local area network hotspot when the wireless local area network hotspot is able to determine a geo-location for the wireless local area network hotspot using GPS technology. As shown above, the latitude, longitude, altitude and number of GPS satellites involved in determining the geo-location of the device is included in the message text, i.e., "Lat+ 51.415950(stdv 00029)/Lon+005.424699(stdv 00025)/Alt+ 062 ft(stdv 00024)/GPS sats 04". In addition, the example emergency text message indicates that an emergency is being reported (i.e., EMERGENCY), identifies the date and time at which the emergency text message was sent (i.e., 2014-02017 15:28UTC), identifies the type of device from which the emergency text message was sent and its remaining battery life (i.e., Batt100%), an indication of a preferred language for response (i.e., Lang en), and a number of other devices connected to the device that sent the message (i.e., 2).

The example emergency text message shown above may represent the payload of the emergency text message. In some implementations, the emergency text message also may include a header, a footer, or some other structure that includes network address or other information related to the wireless local area network hotspot that sent the emergency text message. Such information may enable the recipient of the emergency text message to identify the sender of the emergency text message.

In some implementations, an Emergency Alert/SOS mode may be cancelled. For example, a user may be able to cancel the Emergency Alert/SOS mode by manipulating a user interface on a device connected to the wireless local area network hotspot. In such implementations, in response to the Emergency Alert/SOS mode being cancelled, the wireless local area network hotspot may send a cancellation notification to one or more of the contact addresses to which emergency communications previously were sent. One example of such a cancellation notification appears below:

EMERGENCY CANCEL//////2013-10-15 20:00UTC//[DEVICE TYPE]

Aspects of the present disclosure may be implemented entirely in hardware, entirely in software (including firmware, resident software, micro-code, etc.) or in a combination of hardware and software that may all generally be referred to herein as, for example, a "circuit," "module," "component," or "system."

Furthermore, aspects of the present disclosure may take the form of a computer program product embodied in one or more computer readable media having computer readable program code embodied thereon. Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including object oriented programming languages, dynamic programming languages, and/or procedural programming languages.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, although much of this disclosure was described in the context of local area network hotspots that are connected to satellite communication networks, the scope of this disclosure is not limited to local area network hotspots that are connected to satellite communication networks. Rather, this disclosure extends to local area network hotspots that are connected to other forms of communication networks as well. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   receiving, at a portable, wireless local area network ("LAN") hotspot that provides a wireless LAN to which communications devices can connect wirelessly and through which communications devices connected wirelessly to the wireless LAN can access another network, a request to initiate emergency communications; and
   in response to receiving the request to initiate emergency communications:
      determining a number of communications devices currently connected wirelessly to the wireless LAN,
      determining a current location of the wireless LAN hotspot,
      determining that the wireless LAN hotspot has been loaded with a contact address for an emergency contact,
      generating a distress message including the number of communications devices currently connected wirelessly to the wireless LAN and the current location of the wireless LAN hotspot, and
      transmitting the distress message to the contact address via the other network.

2. The method of claim 1, wherein:
   the other network is a satellite communications network such that communications devices connected wirelessly to the wireless LAN can access the satellite communications network through the wireless LAN hotspot; and
   transmitting the distress message to the contact address via the other network includes transmitting the distress message to the contact address via the satellite communications network.

3. The method of claim 1, wherein transmitting the distress message to the contact address further comprises interrupting, by the wireless LAN hotspot, communications between one or more communications devices wirelessly connected to the wireless LAN hotspot and one or more other devices conducted through the wireless LAN hotspot and over the other network.

4. The method of claim 1, wherein:
   the wireless LAN hotspot comprises a physical control for initiating emergency communications; and
   receiving the request to initiate emergency communications at the portable wireless LAN hotspot includes receiving the request to initiate emergency communications as a consequence of physical, human interaction with the physical control for initiating emergency communications.

5. The method of claim 1, wherein receiving the request to initiate emergency communications at the portable wireless LAN hotspot includes receiving the request to initiate emergency communications at the portable wireless LAN hotspot over the wireless LAN from a communications device connected wirelessly to the wireless LAN.

6. The method of claim 1, wherein determining a current location of the wireless LAN hotspot includes:
   receiving one or more signals from a global navigation satellite system; and
   determining the current location of the wireless LAN hotspot based on the one or more signals received from the global navigation satellite system.

7. The method of claim 1, wherein transmitting a distress message to the contact address via the other network includes transmitting a text message to the contact address via the other network.

8. The method of claim 1, wherein transmitting a distress message to the contact address via the other network includes transmitting a short message service ("SMS") message to the contact address via the other network.

9. The method of claim 1, wherein transmitting a distress message to the contact address via the other network includes transmitting an Internet Protocol ("IP") message to the contact address via the other network.

10. The method of claim 1, wherein transmitting a distress message to the contact address via the other network includes transmitting a data message to the contact address via the other network.

11. The method of claim 1, wherein transmitting a distress message to the contact address via the other network includes transmitting a telephone message to the contact address via the other network.

12. The method of claim 1, further comprising:
    receiving, at the wireless LAN hotspot, a response from the contact address for the emergency contact via the other network; and
    transmitting the response from the contact address for the emergency contact to at least one communications device connected wirelessly to the wireless LAN hotspot.

13. The method of claim 12, wherein:
    receiving the response further comprises receiving a voice call at the wireless LAN hotspot via the other network; and
    transmitting the response comprises facilitating a voice call between the contact address for the emergency contact and a communications device wirelessly connected to the wireless LAN hotspot.

14. The method of claim 12, wherein:
    receiving the response further comprises receiving a short message service ("SMS") message at the wireless LAN hotspot via the other network; and
    transmitting the response comprises transmitting the SMS message to a communications device wirelessly connected to the wireless LAN hotspot.

15. The method of claim 1, further comprising, in further response to receiving the request to initiate emergency communications, identifying users that are logged in to the communication devices currently connected wirelessly to the wireless LAN, wherein the distress message further includes information indicative of the users that are logged in to the communication devices.

16. A portable, wireless local area network ("LAN") hotspot comprising:
    a wireless LAN subsystem configured to provide a wireless LAN to which communications devices can connect wirelessly;
    a communications subsystem configured to connect the wireless LAN hotspot to another communications network such that communications devices wirelessly connected to the wireless LAN can access the other network;
    one or more processing elements configured to execute instructions received from computer-readable storage; and
    computer-readable storage storing instructions that, when executed by the one or more processing elements, cause the wireless LAN hotspot to:

load a contact address for an emergency contact into the computer-readable storage;
process a request to initiate emergency communications received by the wireless LAN hotspot; and
as a consequence of having processed the request to initiate emergency communications:
determine a number of communications devices connected to the wireless LAN hotspot and location information of the wireless LAN hotspot,
generate a distress message including the number of communications devices connected to the wireless LAN hotspot and the location information, and
transmit the distress message to the contact address.

17. The portable, wireless LAN hotspot of claim 16, wherein:
the communications subsystem configured to connect the wireless LAN hotspot to another communications network such that communications devices wirelessly connected to the wireless LAN can access the other network comprises a satellite communications subsystem configured to connect the wireless LAN hotspot to a satellite communications network over a wireless satellite link such that communications devices wirelessly connected to the wireless LAN can access the satellite communications network; and
the instructions that, when executed by the one or more processing elements, cause the wireless LAN hotspot to transmit the distress message to the contact address include instructions that, when executed by the one or more processing elements, cause the wireless LAN hotspot to transmit the distress message to the contact address from the wireless LAN hotspot over the satellite communications network via the satellite link.

18. The portable, wireless LAN hotspot of claim 16, wherein the instructions that, when executed by the one or more processing elements, cause the wireless LAN hotspot to transmit the distress message to the emergency contact include instructions that, when executed by the one or more processing elements, cause the wireless LAN hotspot to terminate communications between one or more communications devices connected to the wireless LAN hotspot and one or more other devices conducted through the wireless LAN hotspot.

19. The portable, wireless LAN hotspot of claim 16, wherein the computer-readable storage further stores instructions that, when executed by the one or more processing elements, cause the wireless LAN hotspot to:
process a response received from the contact address for the emergency contact; and
transmit the response to at least one of the communications devices connected to the wireless LAN.

20. The portable, wireless LAN hotspot of claim 19, wherein:
the instructions that, when executed by the one or more processing elements, cause the wireless LAN hotspot to process the response further include instructions that, when executed by the one or more processing elements, cause the wireless LAN hotspot to process a voice call received at the wireless LAN hotspot; and
the instructions that, when executed by the one or more processing elements, cause the wireless LAN to transmit the response include instructions that, when executed by the one or more processing elements, cause the wireless LAN hotspot to facilitate a voice call between the contact address for the emergency contact and a communication device connected to the wireless LAN hotspot.

21. A portable, wireless local area network ("LAN") hotspot comprising:
a wireless LAN subsystem configured to provide a wireless LAN to which communications devices can connect wirelessly;
a communications subsystem configured to connect the wireless LAN hotspot to another communications network such that communications devices wirelessly connected to the wireless LAN can access the other network;
one or more processing elements configured to execute instructions received from computer-readable storage; and
computer-readable storage storing instructions that, when executed by the one or more processing elements, cause the wireless local area network hotspot to:
process a request received by the wireless LAN hotspot to initiate emergency communications; and
as a consequence of having processed the request to initiate emergency communications:
determine a number of communications devices currently connected wirelessly to the wireless LAN,
determine a current location of the wireless LAN hotspot,
determine that the wireless LAN hotspot has been loaded with a contact address for an emergency contact,
generate a distress message including the number of communications devices currently connected wirelessly to the wireless LAN and the current location of the wireless LAN hotspot, and
transmit the distress message to the contact address via the other network.

22. The portable, wireless LAN hotspot of claim 21, wherein the computer-readable storage further stores instructions that, when executed by the one or more processing elements, cause the wireless LAN hotspot to:
process a response received by the communications subsystem from the emergency contact;
identify, in response to receiving the response, a particular communications device connected wirelessly to the wireless LAN; and
transmit the response to the particular communications device connected wirelessly to the wireless LAN.

23. The portable, wireless LAN hotspot of claim 21, wherein the computer-readable storage further stores instructions that, when executed by the one or more processing elements, cause the wireless LAN hotspot to:
process a response received by the communications subsystem from the emergency contact;
determine, in response to receiving the response, if any communications devices currently are connected wirelessly to the wireless LAN; and
display a notification of the received response at the wireless LAN hotspot as a consequence of having determined that no communications devices currently are connected wirelessly to the wireless LAN.

24. The portable, wireless LAN hotspot of claim 21, wherein:
the communications subsystem configured to connect the wireless LAN hotspot to another communications network such that communications devices wirelessly connected to the wireless LAN can access the other network comprises a satellite communications subsystem configured to wirelessly connect the wireless LAN hotspot to a satellite communications network over a satellite link; and the instructions that, when executed by the one or more processing elements, cause the wireless LAN hotspot to transmit the distress message to the contact address via the other network include instructions that, when executed by the one or more processing elements, cause the wireless LAN hotspot to transmit the distress message to the contact address via the satellite communications network.

25. The portable, wireless LAN hotspot of claim 21, wherein the instructions that, when executed by the one or more processing elements, cause the wireless LAN hotspot to transmit the distress message to the contact address include instructions that, when executed by the one or more processing elements, cause the wireless LAN hotspot to interrupt communications between one or more communications devices wirelessly connected to the wireless LAN hotspot and one or more other devices conducted through the wireless LAN hotspot and over the other network.

26. The portable, wireless LAN hotspot of claim 21, wherein:
   the wireless LAN hotspot comprises a physical control for initiating emergency communications; and
   the instructions that, when executed by the one or more processing elements, cause the wireless LAN hotspot to process a request received by the wireless LAN hotspot to initiate emergency communications include instructions that, when executed by the one or more processing elements, cause the wireless LAN hotspot to process a request to initiate emergency communications triggered as a consequence of physical, human interaction with the physical control for initiating emergency communications.

27. The portable, wireless LAN hotspot of claim 21, wherein the instructions that, when executed by the one or more processing elements, cause the wireless LAN hotspot to process a request received by the wireless LAN hotspot to initiate emergency communications include instructions that, when executed by the one or more processing elements, cause the wireless LAN hotspot to process a request to initiate emergency communications received by the wireless LAN hotspot over the wireless LAN from a communications device connected wirelessly to the wireless LAN.

28. The portable, wireless LAN hotspot of claim 21, wherein the instructions that, when executed by the one or more processing elements, cause the wireless LAN hotspot to determine a current location of the wireless LAN hotspot include instructions that, when executed by the one or more processing elements, cause the wireless LAN hotspot to:
   process one or more signals received from a global navigation satellite system; and
   determine the current location of the wireless LAN hotspot based on processing the one or more signals received from the global navigation satellite system.

29. The portable, wireless LAN hotspot of claim 21, wherein the instructions that, when executed by the one or more processing elements, cause the wireless LAN hotspot to transmit the distress message to the contact address via the other network include instructions that, when executed by the one or more processing elements, cause the wireless LAN hotspot to transmit a text message to the contact address via the other network.

30. The portable, wireless LAN hotspot of claim 21, wherein the instructions that, when executed by the one or more processing elements, cause the wireless LAN hotspot to transmit the distress message to the contact address via the other network include instructions that, when executed by the one or more processing elements, cause the wireless LAN hotspot to transmit a short message service ("SMS") message to the contact address via the other network.

31. The portable, wireless LAN hotspot of claim 21, wherein the instructions that, when executed by the one or more processing elements, cause the wireless LAN hotspot to transmit the distress message to the contact address via the other network include instructions that, when executed by the one or more processing elements, cause the wireless LAN hotspot to transmit an Internet Protocol ("IP") message to the contact address via the other network.

32. The portable, wireless LAN hotspot of claim 21, wherein The portable, wireless LAN hotspot of claim 20, wherein the instructions that, when executed by the one or more processing elements, cause the wireless LAN hotspot to transmit the distress message to the contact address via the other network include instructions that, when executed by the one or more processing elements, cause the wireless LAN hotspot to transmit a data message to the contact address via the other network.

33. The portable, wireless LAN hotspot of claim 21, wherein the instructions that, when executed by the one or more processing elements, cause the wireless LAN hotspot to transmit the distress message to the contact address via the other network include instructions that, when executed by the one or more processing elements, cause the wireless LAN hotspot to transmit a telephone message to the contact address via the other network.

34. The portable, wireless LAN hotspot of claim 21, wherein the computer-readable storage further stores instructions that, when executed by the one or more processing elements, cause the wireless LAN hotspot to:
   process a response from the contact address for the emergency contact received at the wireless LAN hotspot via the other network; and
   transmit the response from the contact address for the emergency contact to at least one communications device connected wirelessly to the wireless LAN hotspot.

35. The portable, wireless LAN hotspot of claim 34, wherein:
   the instructions that, when executed by the one or more processing elements, cause the wireless LAN hotspot to process a response from the contact address for the emergency contact received at the wireless LAN hotspot via the other network include instructions that, when executed by the one or more processing elements, cause the wireless LAN hotspot to process a voice call from the contact address for the emergency contact received at the wireless LAN hotspot via the other network; and
   the instructions that, when executed by the one or more processing elements, cause the wireless LAN hotspot to transmit the response include instructions that, when executed by the one or more processing elements, cause the wireless LAN hotspot to facilitate a voice call between the contact address for the emergency contact and a communications device wirelessly connected to the wireless LAN hotspot.

36. The portable, wireless LAN hotspot of claim 34, wherein:
   the instructions that, when executed by the one or more processing elements, cause the wireless LAN hotspot to process a response from the contact address for the emergency contact received at the wireless LAN hotspot via the other network include instructions that, when executed by the one or more processing elements, cause the wireless LAN hotspot to process a short message service ("SMS") message from the emergency contact received at the wireless LAN hotspot via the other network; and the instructions that, when executed by the one or more processing elements, cause the wireless LAN hotspot to transmit the response include instructions that, when executed by the one or more processing elements, cause the wireless LAN hotspot to transmit the SMS message to a communications device wirelessly connected to the wireless LAN hotspot.

* * * * *